April 19, 1932. A. A. VORNDIEKE Re. 18,436

WRINGER

Original Filed Sept. 10, 1928 3 Sheets-Sheet 1

Inventor:
Anthony A. Vorndieke,
By Chindahl, Parker & Carlson
Attys.

April 19, 1932. A. A. VORNDIEKE Re. 18,436

WRINGER

Original Filed Sept. 10, 1928 3 Sheets-Sheet 2

Inventor:
Anthony A. Vorndieke,
By Chindahl, Parker & Carlson
Attys.

April 19, 1932. A. A. VORNDIEKE Re. 18,436

WRINGER

Original Filed Sept. 10, 1928 3 Sheets-Sheet 3

Inventor:
Anthony A. Vorndieke,
By Christabel Parke Carlson
Attys.

Reissued Apr. 19, 1932

Re. 18,436

UNITED STATES PATENT OFFICE

ANTHONY A. VORNDIEKE, OF CINCINNATI, OHIO, ASSIGNOR TO VOSS BROS. MFG. COMPANY, OF DAVENPORT, IOWA, A CORPORATION OF IOWA

WRINGER

Original No. 1,774,774, dated September 2, 1930, Serial No. 305,063, filed September 10, 1928. Application for reissue filed October 7, 1931. Serial No. 567,509.

This invention relates to wringers for various purposes and is exemplified herein as applied to a wash wringer. The invention, however, is not restricted in its application to wash wringers.

An object of the invention is to provide release means whereby the wringer rolls may be released in various manners, whereby a person who may have had one or both hands caught between the rolls may cause such release of the rolls that the rolls will cease to function cooperatively.

Another object is to provide simple and efficient means for the purpose indicated. These and other objects are attained by the means described herein and disclosed in the accompanying drawings, in which.

Figure 2:
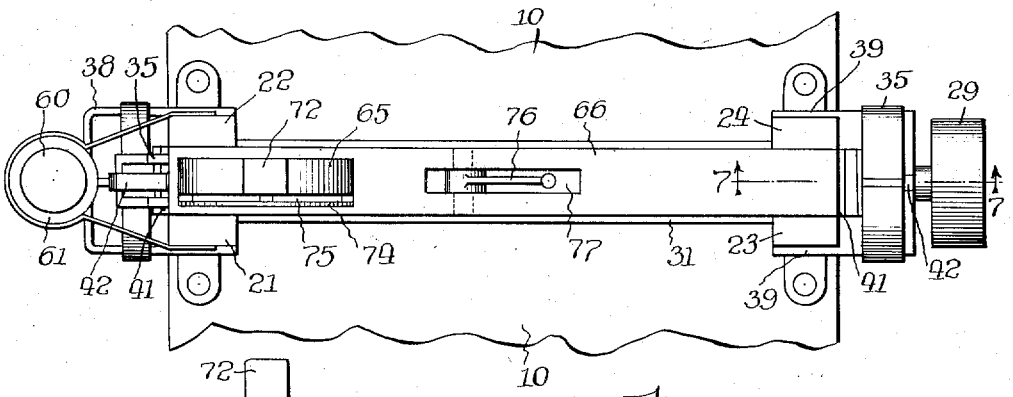
Fig. 2 is a plan view of the device shown in Fig. 1.
Figure 1:
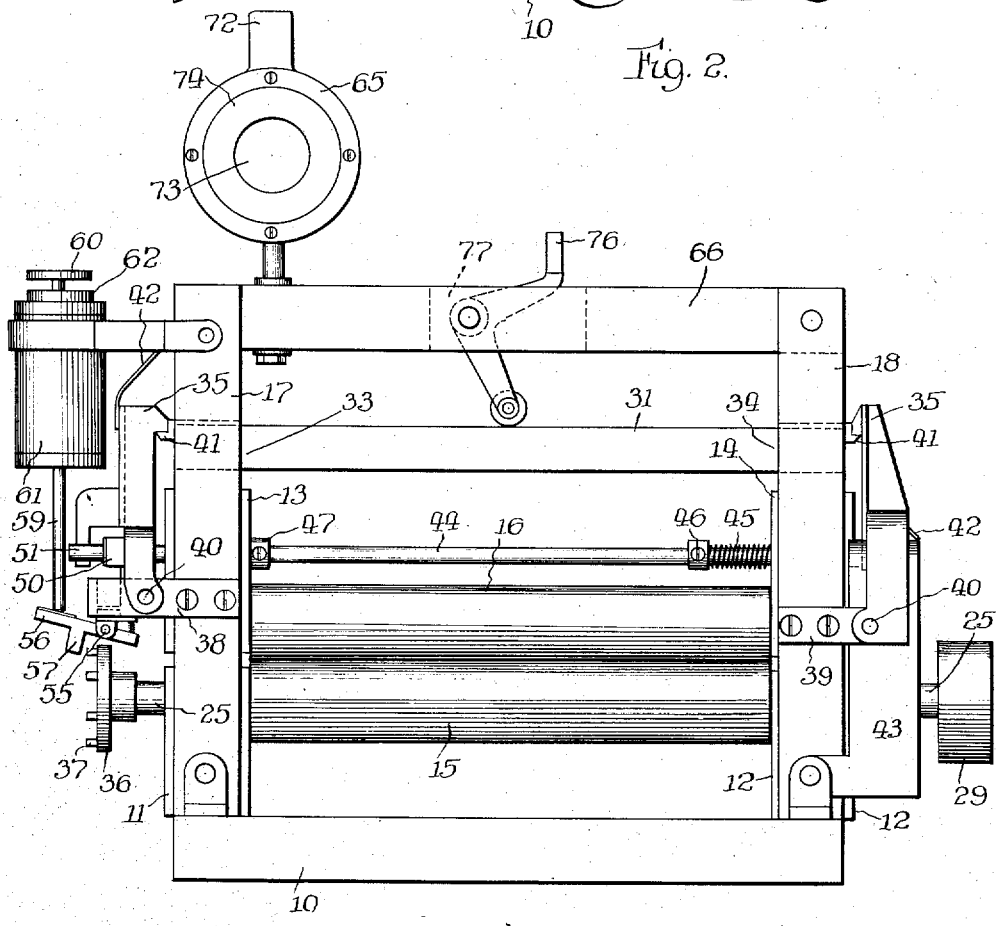
Fig. 1, is front elevation, showing device embodying the invention.
Figure 3:
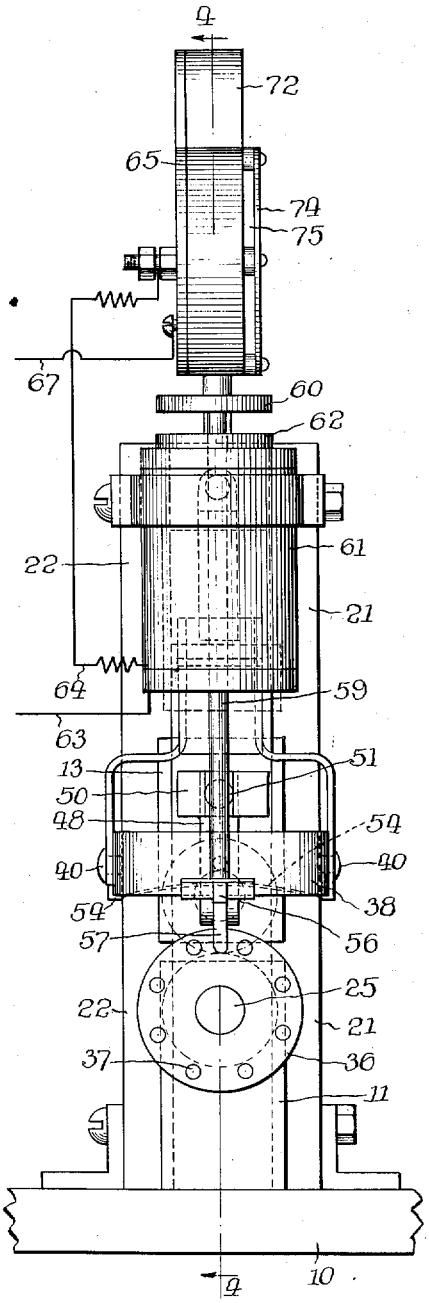
Fig. 3 is a side elevation of the device shown in Fig. 1.

The frame 10 may be of any suitable form and serves as a support for suitable bearings 11, 12, 13 and 14 for the cooperating rolls 15 and 16. The bearings 11 and 12 are preferably fixed and the bearings 13 and 14 are preferably slidable vertically of the frame. To this end, the frame has its sides 17 and 18 slotted for providing vertical ways 19 and 20 between the opposed branches 21 and 22 of side 17 and opposed branches 23 and 24 of side 18. Bearings 11 and 13 are disposed in way 19 and bearings 12 and 14 are disposed in way 20.

The roll 15 is supported by shaft 25 extending through bearings 11 and 12, and shaft 25 carries a suitable gear or cog 26 for meshing with a cog or gear 27 on shaft 28 that supports roll 16. Shaft 28 is supported by bearings 13 and 14. On shaft 25 is a suitable pulley 29 or other means whereby power may be transmitted to shaft 25.

Cooperating cogs or gears such as 26 and 27 may be disposed at both ends of shafts 25 and 28. Suitable springs 30 are interposed between bearings 11 and 13 and between bearings 12 and 14.

Figure 4:
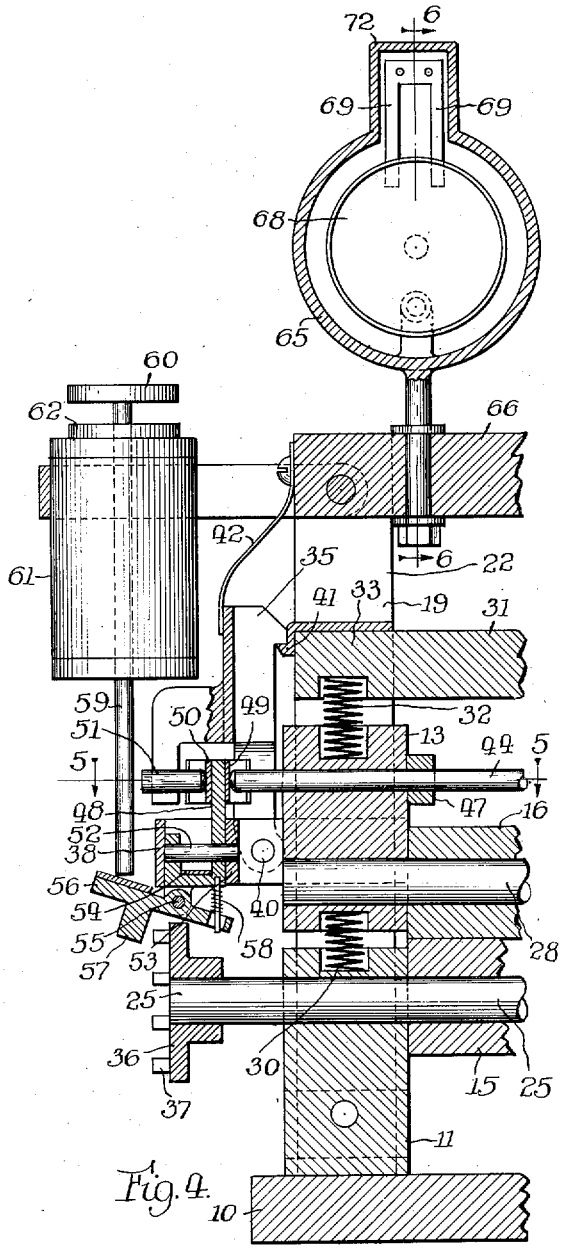
Fig. 4 is a sectional view on line 4—4 of Fig. 3.
Figure 5:
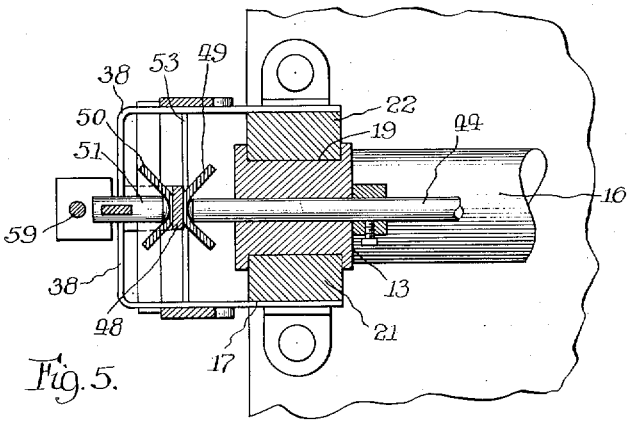
Fig. 5 is a sectional view on line 5—5 of Fig. 4.
Figure 6:
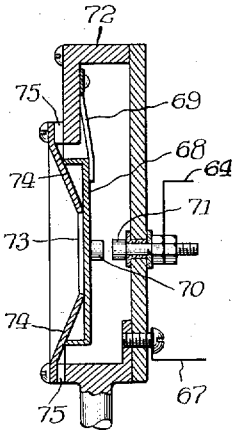
Fig. 6 is an enlarged sectional view on line 6—6 of Fig. 4.
Figure 7:
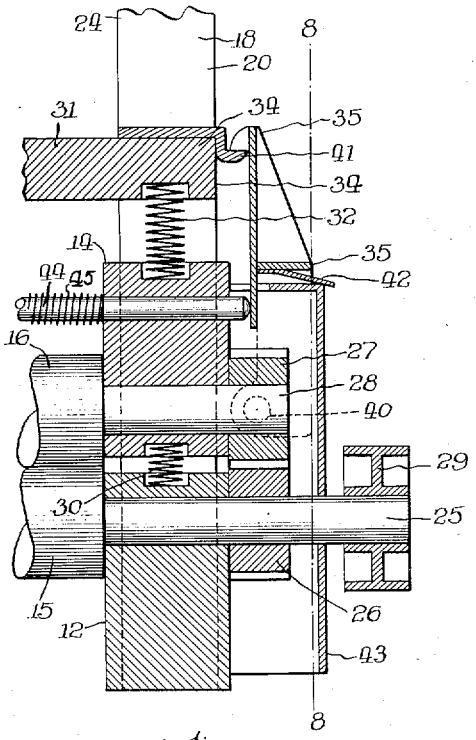
Fig. 7 is a sectional view on line 7—7 of Fig. 2.
Figure 8:
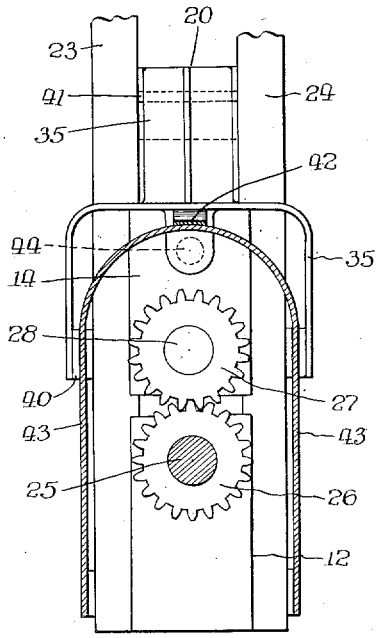
Fig. 8 is a sectional view on line 8—8 of Fig. 7.

A cross bar 31 has its opposite ends disposed in the upper ends of ways 19 and 20. Suitable springs 32 are disposed between bearing 13 and end 33 of bar 31 and between bearing 14 and end 34 of bar 31. Each end of the bar 31 is provided with a lug or detent 41. At each side of the frame is disposed a catch 35 that may engage with a detent 41 and retain the bar 31 in such position that springs 32 urge the roll 16 toward and against roll 15 for retaining the rolls and cogs in cooperative relationship. Upon release of the detents from the catches, the springs 32 and 30 and roll 16 are released. The power used for releasing the roll 16 is taken from shaft 25, see Fig. 4. On shaft 25 is a disk 36 carrying pins 37. Any one of the pins 37 can actuate or trip the mechanism about to be described, for releasing roller 16.

At each side of the frame is provided a strap like member 38 and 39. The members 38 and 39 shown herein are not identical in shape, yet their functions are in major portion, the same. Each member 38 and 39 serves as a means for pivotally supporting one of the catch members 35. Each catch member 35 is mounted on a pivot or suitable stud 40. The catch members are moved about the axes of the pivots or studs 40 for release and engagement of the catches with their respective lugs or detents 41.

Springs 42 yieldingly urge the catches toward the sides of the frame so that the catches are normally and yieldingly retained in positions where they may contact and engage with the lugs or detents 41. The member 39 may be integral with the cap or housing 43 within which the cogs 26 and 27 are enclosed. The one member 35 is moved about its axis 40 for releasing end 34 of bar 31, by means of a rod 44, reciprocally supported by bearing blocks 13 and 14. A spring 45, having its opposite ends in abutment on bearing block 14 and collar 46, fixed on rod 44, yieldingly holds the rod in a position where the rod is inoperative on its cooperating catch member 35. A suitable abutment collar 47 may cooperate with bearing 13 to limit movement of rod 44 under the influence of spring 45. The end of rod 44, remote from its cooperating catch member 35 may be contacted by a cam 48 for imparting longitudinal movement to rod 44. The same cam is employed for actuating both catch members. The cam is, therefore, provided with two cam plates, viz., 49 and 50, each of which controls one catch member. The second catch member 35 carries a stud 51 that may be aligned with rod 44 and which on operation by its cooperating cam plate 50 actuates the catch member about its axis 40. The cam plates 49 and 50 are preferably arcuate so that movement of the cam plates in opposite directions will have the same effect upon the rod 44 and stud 51 for releasing roll 16.

The cam body 48 is pivotally supported by a suitable stud or shaft 52 and shaft 52 may be supported by strap-like member 38, for example by means of cross-piece 53 carried by member 38. The body of cam 48 is U-shaped and a flat spring 54 is disposed between the arms thereof and the ends of the spring contact the lower edge of the strap member 38. The ends of the spring 54 may be angular and may project upwardly over the outer face of the strap member 38. The spring yieldingly holds the cam in a position in which the cam is inoperative for actuating the rod 44 and stud 51.

The cam body 48 carries a stud or shaft 55. On shaft 55 is supported a trip finger 56 carrying a lug 57 that may be moved into the path of the pins 37. A spring 58 yieldingly holds the finger in such normal position wherein the lug 57 is disposed out of the path of the pins 37.

The release of the wringer rolls to permit movement thereof out of cooperative relation is electro-magnetically effected. Thus, the trip finger may be actuated for introducing the lug 57 in the path of pins 37, by means of stem 59, carried by the armature 60 of electromagnet 61. Normally the electromagnet is deenergized, and the spring 58 holds the armature at a distance from the core 62 of the electromagnet. The stem 59 may extend reciprocally through the core 62. The stem 59 may be manually actuated for tripping the device by manual depression of armature 60. End 63 of the electromagnet winding may be electrically connected with any suitable source of electrical energy, not shown. If a motor is used to operate the wringer, the end 63 may be connected with the source of energy used for the motor, otherwise a battery may be connected to end 63. End 64 of the winding is electrically connected to a switch 65 that may be mounted on the top member 66 of the frame 10. Other switches may be provided in parallel with switch 65, and may be so positioned that an operator's foot, knee or other part of the body may be used to close the circuit through the electromagnet, should the operator's hands be caught between the wringer rolls. The conductor 67 leaving the switch is connected with the source of electrical energy.

The switch 65, shown herein, is one that may be closed by blowing breath against same. In those instances where an operator might have both hands caught between the rolls, the operator's head would be rather close to the top of the device and, therefore, the operator could release her hands by merely blowing against a diaphragm 68, suspended by a lightly tensioned spring 69, and thereby effecting contact between contacts 70 and 71. Adjustment of the gap between contacts 70 and 71 may be effected in any suitable manner and with any means commonly used for such purpose. The casing 72 of the switch may be mounted on the top member in any suitable manner and may be so adjusted that the diaphragm may be actuated from any direction. If desired, a plurality of similar switches, fixed or adjustable relative to the frame, may be provided. Preferably the diaphragm in its normal position, closes the opening 73 in the truncated conical plate 74 of the device, and air gaps 75 are provided about the diaphragm, at the rear of plate 74, whereby to obviate building up of pressure at the rear of the diaphragm that might hinder free and easy operation of the switch.

The cross bar 31 may be depressed by means of a suitable lever 76, pivoted in a suitable aperture 77 provided through the top member 66. The lever serves to simultaneously engage both lugs 41 with their respective catch members, and the tripping of the finger 56 by any of the pins 37 serves to oscillate the cam 48 whereby to simultaneously release both lugs 41 from their respective catch members.

I claim as my invention:

1. In a device of the class described, the combination of a pair of rolls adapted for movement to and from cooperative relationship, means for imparting power to one of said rolls, means for holding the rolls in cooperative relationship, means for moving and normally retaining the rolls out of cooperative relationship, a trip mechanism operative from the power actuated roll for rendering the holding means inoperative whereby the moving and retaining means may move the rolls out of cooperative relationship, and means operable manually and electrically for actuating the trip mechanism.

2. The combination of power actuated rollers, means for moving the rollers to and from cooperative relationship, an electrical switch comprising a member capable of being moved by air pressure for completing a circuit through the switch, and means in circuit therewith for rendering the first mentioned means operative for moving the rollers from cooperative relationship.

3. The combination of a pair of rolls, means for urging the rolls toward one another, means for imparting rotary movement to the rolls, means yieldingly urging the rolls away from one another, a disk for movement with one of the rolls, pins on the disk, means for holding the first mentioned means in position such that the rolls cooperate, means for moving the holding means for releasing the first mentioned means from the holding means, a cam for operating the moving means, means connected with the cam and movable into position for contact with a pin on the disk, and means for moving the last mentioned means into position for contact with a pin whereby power from the means for imparting movement to the rolls will actuate the moving means for releasing the first mentioned means from the holding means.

4. The combination of a frame having opposed ways, a roll having fixed bearings one each at an end of each of said ways, a pair of reciprocating bearings and a roll carried thereby, one each of which bearings is disposed in one each of said ways, a spring in each way and interposed between the bearings associated with the respective ways and yieldingly urging the bearings away from one another, a disk carried by the roll having fixed bearings, a pin carried by the disk, a bar having its opposed ends in said ways, a detent at each end of the bar, a catch member pivotally mounted at each way and each engageable with a detent, a spring at each end of the bar and each interposed between the bar and one of the reciprocating bearings and yieldingly urging the bar and bearings away from one another, a reciprocating rod carried by the reciprocating bearings and having its one end disposed adjacent one of the catch members, a pivotally mounted cam disposed at the other end of the rod, a stud carried by the second catch member and disposed adjacent the cam, movement of the cam serving to actuate the stud and the reciprocating rod for pivotally moving the catch members, a trip finger pivotally supported by the cam and movable into position for contact with the pin on the disk whereby movement of the pin may actuate the trip finger and the cam, means yieldingly withholding the trip finger from the indicated position wherein the pin may actuate the trip finger, means yieldingly resisting movement of the catch members by the cam, and means for operating the trip finger.

5. The combination of a frame having opposed ways, a roll having fixed bearings one each at an end of each of said ways, a pair of reciprocating bearings and a roll carried thereby, one each of which bearings is disposed in one each of said ways, a spring in each way and interposed between the bearings associated with the respective ways and yieldingly urging the bearings away from one another, a disk carried by the roll having fixed bearings, a pin carried by the disk, a bar having its opposed ends in said ways, a detent at each end of the bar, a catch member pivotally mounted at each way and each engageable with a detent, a spring at each end of the bar and each interposed between the bar and one of the reciprocating bearings and yieldingly urging the bar and bearings away from one another, a reciprocating rod carried by the reciprocating bearings and having its one end disposed adjacent one of the catch members, a pivotally mounted cam disposed at the other end of the rod, a stud carried by the second catch member and disposed adjacent the cam, movement of the cam serving to actuate the stud and the reciprocating rod for pivotally moving the catch members, a trip finger pivotally supported by the cam and movable into position for contact with the pin on the disk whereby movement of the pin may actuate the trip finger and the cam, means yieldingly withholding the trip finger from the indicated position wherein the pin may actuate the trip finger, means yieldingly resisting movement of the catch members by the cam, a reciprocally mounted manually operable stem for operating the trip finger, and means responsive to electrical energy for operating the stem.

6. The combination of power actuated rolls, releasable means for rendering the rolls cooperative and non-cooperative, electrically operable means for operation of the releasable means, an electrical circuit embracing the electrically operable means, and a switch comprising a movable diaphragm and normally-separated electrical contacts adjacent thereto, said switch being operable by air pressure for conditioning the circuit for operation of the electrically operable means.

7. The combination of power actuated rolls, releasable means for rendering the rolls cooperative and non-cooperative, means operable manually and electrically for operation of the releasable means, an electrical circuit embracing the electrically operable means, and a switch comprising a movable diaphragm and normally-separated electrical contacts adjacent thereto, said switch being operable by air pressure for conditioning the circuit for operation of the manually and electrically operable means.

8. In a device of the class described, the combination of a pair of rolls adapted for movement to and from cooperative relationship, means for holding said rolls in cooperative relationship, means for moving and normally retaining said rolls out of such relationship, trip mechanism for rendering the holding means inoperative whereby the moving and retaining means may move the rolls out of cooperative relationship, and means operable electrically for actuating the trip mechanism.

9. A safety release mechanism for a wringer device embodying a pair of rolls having relative movement toward and away from each other, means normally urging said rolls apart, holding means for maintaining said rolls in adjacent cooperative relationship, trip mechanism for releasing said holding means, and electrically operated means for actuating said trip mechanism.

10. In a wringer construction, the combination of a pair of rolls mounted for movement into and out of cooperative relationship, means for holding the rolls in cooperative relationship and electro-magnetically actuated means for releasing said holding means.

11. In a wringer construction, the combination of wringer rolls, means for holding said rolls in contiguous cooperative relation, and means for releasing said holding means including an electro-magnetic actuating device, and a switch for controlling the energization and deenergization of said device disposed for convenient manipulation by an operator.

12. In a device of the character described, the combination of rolls, means for moving the rolls to and away from cooperative relationship, an electrical circuit including an electric switch operable by an operator, and means in the circuit controlled by the switch for rendering the roll-moving means operative to move the rollers away from their cooperative relationship.

13. In a wringer construction, the combination of a pair of wringer rolls mounted for relative movement into and out of a position of contiguous relationship, resilient means cooperating with said rolls when tensioned to force said rolls into the contiguous position, a trip mechanism for maintaining said resilient means under tension, and electro-magnetically actuated means for releasing said trip mechanism whereby to free said rolls for relative movement out of said contiguous position.

In testimony whereof, I have hereunto affixed my signature.

ANTHONY A. VORNDIEKE.